United States Patent [19]

Davidson et al.

[11] Patent Number: 5,040,005
[45] Date of Patent: Aug. 13, 1991

[54] METHOD OF CREATING THREE-DIMENSIONAL DISPLAYS USING PREDISTORTED IMAGES

[75] Inventors: Geoffrey Davidson; John Davidson, both of Kingston, Canada

[73] Assignee: 3D Technology Ltd., Switzerland

[21] Appl. No.: 443,780

[22] Filed: Nov. 30, 1989

[30] Foreign Application Priority Data

Nov. 30, 1988 [GB] United Kingdom ............... 8827952

[51] Int. Cl.$^5$ .............................................. G03B 29/00
[52] U.S. Cl. ................................... 354/76; 354/290; 354/292; 355/47; 355/52
[58] Field of Search ............. 354/76, 77, 75, 290, 354/291, 292; 355/52, 22, 47

[56] References Cited

U.S. PATENT DOCUMENTS 3,314,329 4/1967 Wolbert ........................... 355/47
3,368,471 12/1968 Beato ............................... 355/91

FOREIGN PATENT DOCUMENTS 1313445 1/1962 France .
966738 1/1962 United Kingdom .

Primary Examiner—L. T. Hix
Assistant Examiner—Howard B. Blankenship
Attorney, Agent, or Firm—Marger, Johnson, McCollom & Stolowitz, Inc.

[57] ABSTRACT

A method for producing a three-diemnsional display device comprising the steps of photographing multiple views of a three dimension object, projecting the multiple perspective photographic views of the original object onto a topographically correct surface, and vacuum forming an image to full relief of the original object with all visual information in its correct location and without distortion.

5 Claims, 8 Drawing Sheets

METHOD OF CREATING THREE-DIMENSIONAL DISPLAYS USING PREDISTORTED IMAGES

FIELD OF THE INVENTION

The present invention relates in general to display devices, and more particularly to a method for creating a display device having a three-dimension appearance to provide a striking visual effect.

BACKGROUND OF THE INVENTION

Advertising displays and posters often bear photographic reproduction of an object or objects offered for sale in a two-dimensional appearance. Such advertising displays and posters may be suitable for point of purchase displays, bill-boards, mall displays or home display, etc.

To a limited extent, thermoforming technology has been used in the past in conjunction with photographic imaging for creating bas-relief three-dimension displays. However, the results have been unimpressive due to distortion involved in translating from a two-dimensional image to a three-dimensional object, and vice versa.

There are three major forms of distortion that occur when a two-dimensional image derived from a single (primary) point of view is thermoformed over a three-dimensional topography. Of these three types of distortion, only one has been partially addressed by currently available technology. The effects of stretch and flow upon lettering colour boundaries, as plastic is thermoformed over a topographic mold is known in the prior art and has been partially corrected for a number of years. However, the method of such correction has not been found to be sufficiently accurate for creating detailed three-dimensional display devices. Furthermore, two other forms of distortion are equally important to the process of translating from two to three-dimensions, especially when incorporating a photographic rather than purely graphic image into a three-dimensional thermoform.

The second major form of distortion is known as parallax distortion or shadowing, and occurs when areas of a three-dimensional object cannot be recorded on a two-dimensional photograph because the line of sight from the primary point of view is obstructed by some portion of the object. After vacuum forming of the two-dimensional image over the three-dimensional mold, these areas of the final image are filled with information from adjacent regions by stretching of the thermoformable plastic sheet, resulting in a severe form of distortion.

The third major form of distortion is known as foreshortening, and occurs when areas of the three-dimensional object which are at an acute angle to the primary point of view are visually compressed and photographed onto a two-dimensional film. When the resulting image is vacuum formed over a topographic mold, the visually compressed information is not large enough to fill the topographic area from which it was derived, even taking into account the stretch and flow distortion which occurs in these areas.

Traditionally, the above discussed problems have been overcome by one of two methods. The effects of foreshortening and parallax distortion have been minimized by decreasing the amount of relief of the three-dimensional mold so that areas of sharp vertical relief, where the distortion is greatest, are substantially reduced. The effects of stretching on the contours and location of embossed lettering and simple colour boundaries have been overcome in the prior art by plotting the location of the lettering and other details on a blank sheet that has been thermoformed over a topographic mold. The sheet is then thermally flattened and the resulting distorted contours and locations are plotted using an overlay grid.

SUMMARY OF THE INVENTION

According to the present invention, a method is provided for extending and improving the prior art basic techniques for correcting distortion by projecting multiple perspective photographic views of the original three-dimensional object onto a topographically correct surface. This allows the resulting vacuum formed image to have the full relief of the original object with all visual information in its correct location and without and distortion.

In general, the present invention provides a method for the formation of a display device, which comprises photographing the object from multiple perspectives, creating an accurate mold of the object using projected views of the object, forming a predistorted image on a planar sheet of thermoplastic, and thermoforming the planar sheet over a mold having mold parts provided in the outline of the object, so as to form a raised and contoured image from the portion of the screen printed image corresponding to the object.

BRIEF DESCRIPTION OF THE DRAWINGS

A preferred embodiment of the present invention will be described in greater detail below with reference to the following drawings in which.

DETAILED DESCRIPTION OF THE PREFERRED EMBODIMENT

Figure 1:
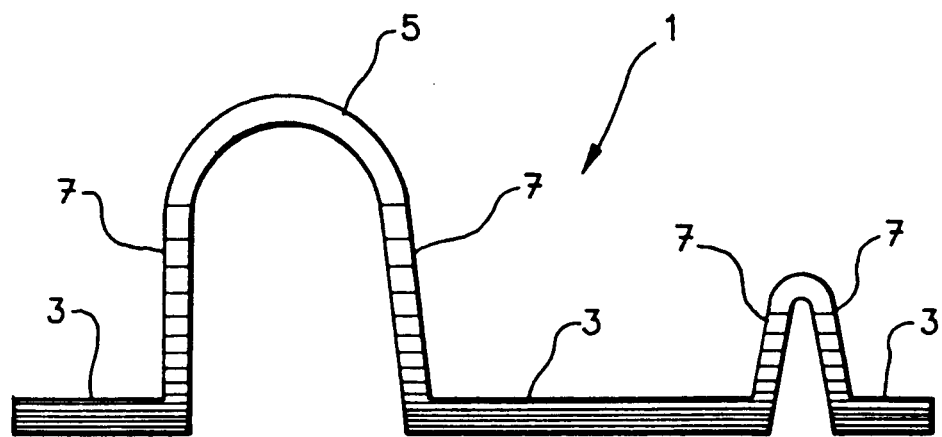
FIG. 1 is a cross section of a three-dimensional object showing locations of graphic details.

Turning to FIG. 1, a cross section of a three-dimensional object 1 is illustrated showing the location of graphic details provided by surfaces 3 and 5 which are fully visible from above and surfaces 7 which become compressed when viewed from above. The regions 5 and 7 of object 1 produce both parallax and foreshortening in a two-dimensional image taken from an orthogonal point of view, as discussed above with reference to the Background of the Invention.

Figure 2:
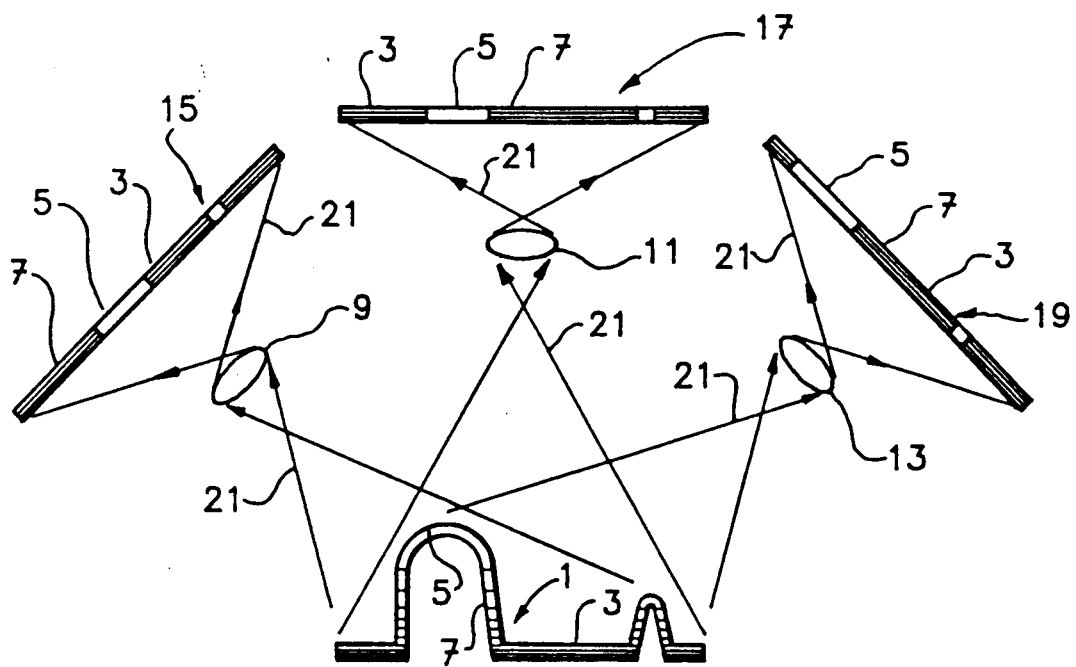
FIG. 2 is a cross sectional schematic showing a two-dimensional photographic image of the three-dimensional object in FIG. 1 taken from three different perspective views.

Turning to FIG. 2, a cross sectional schematic is illustrated showing two-dimensional photographic images of the three-dimensional object 1 taken from three different perspective views by means of lenses 9, 11 and 13. The respective photographic images are depicted as 15, 17 and 19. The arrows 21 show light paths through the lenses 9-13. It will be noted that the photographic images 15, 17 and 19 each exhibit parallax and foreshortening distortions, but in different locations and to differing degrees in accordance with respective perspective views of the object 1.

Figure 3:
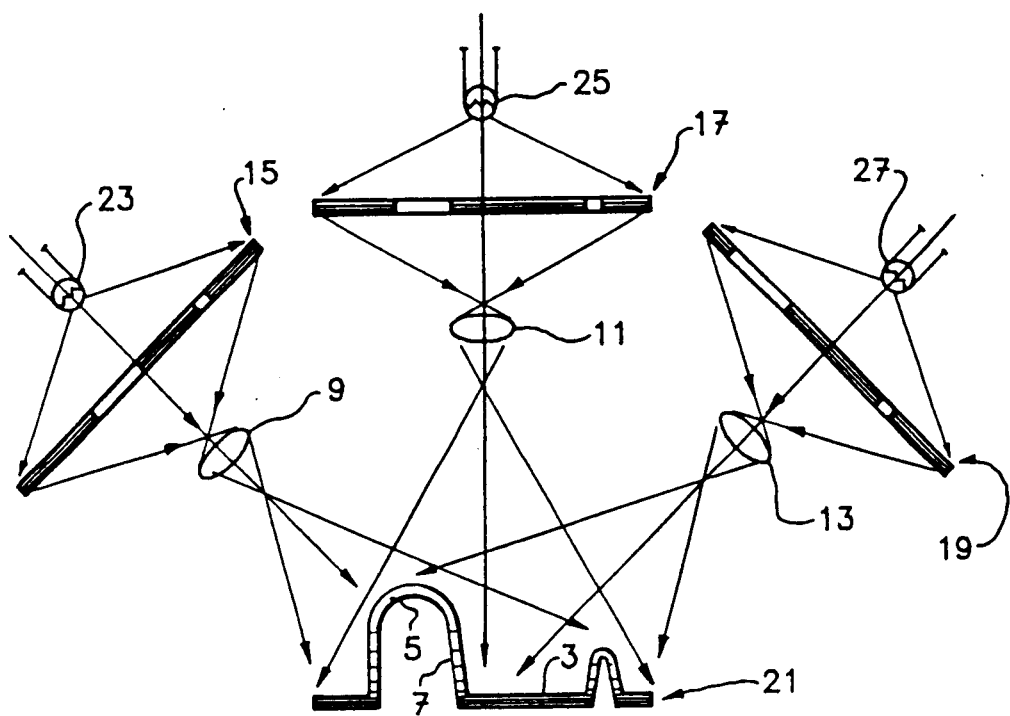
FIG. 3 is a cross sectional schematic showing the multiple two-dimensional images from FIG. 2 projected back onto a topographically correct mold of the original three dimensional object shown in FIG. 1.

Turning to FIG. 3, a cross sectional schematic is illustrated showing the multiple two-dimensional images 15, 17 and 17 projected back onto an accurate topographical mold 21 of the three-dimensional object 1 (FIG. 1). In this respect, projectors 23, 25 and 27 are provided for projecting the images 15, 17 and 18 through lenses 9, 11 and 13 thereby recreating the three-dimensional image on the topographic surface 21. It will be noted that all graphic details 3, 5 and 7 project back to their correct locations without distortions.

Figure 4A:
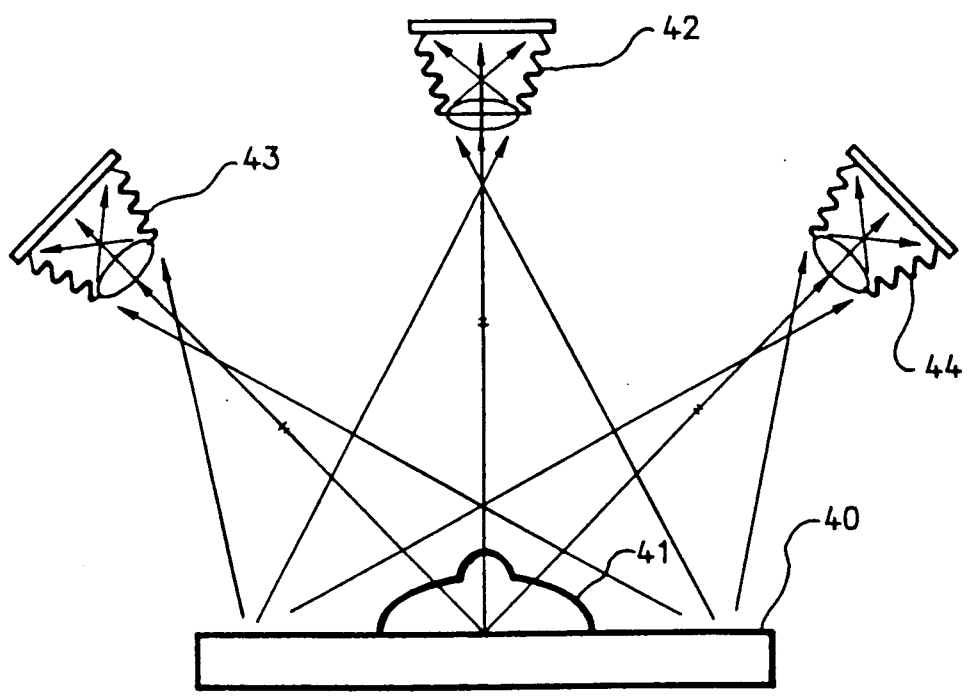
FIG. 4a and 4b show a cross section view and plan view respectively of an arrangement for photographing multiple perspective views of a three-dimensional object in accordance with the preferred embodiment.
Figure 4B:
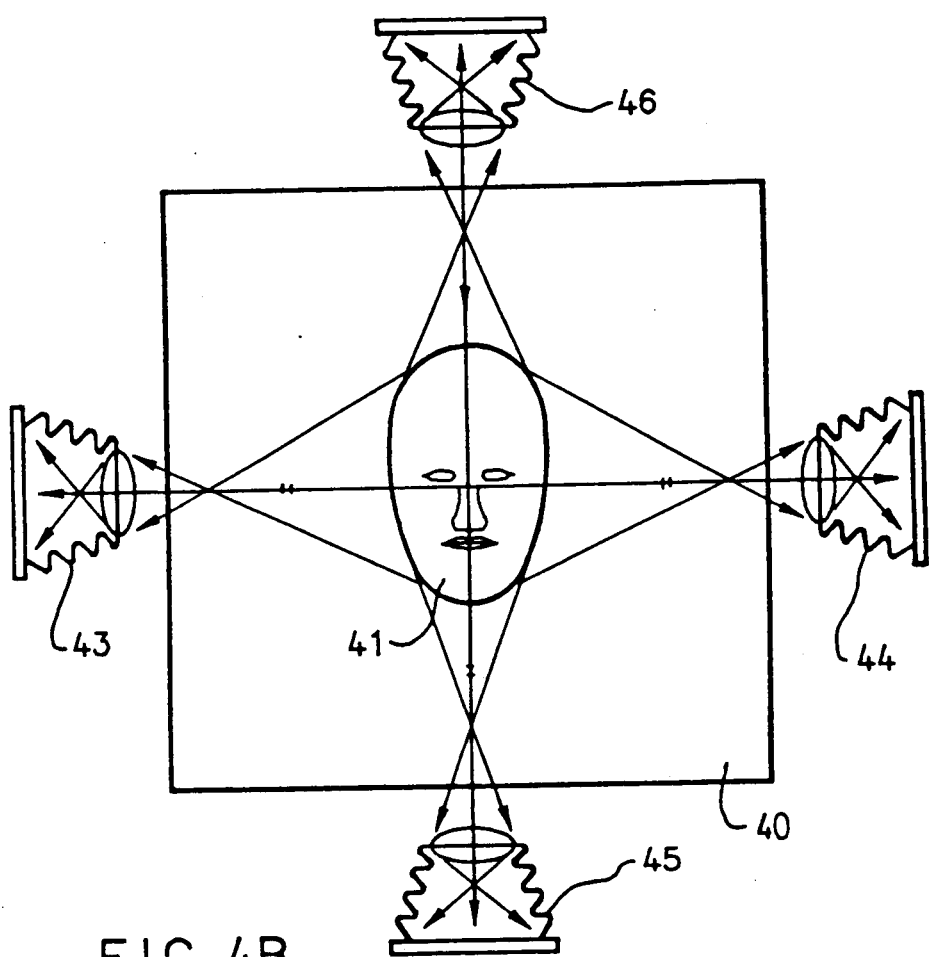

The invention will now be described in greater detail with reference to a preferred embodiment thereof. Turning to FIGS. 4a and 4b, multiple perspective views of a three-dimensional object 41 on a horizontal surface 40 are photographed via primary perspective camera 42 shown in FIG. 4a, and secondary cameras 43-46 positioned at 45° to the line of sight of primary camera 42 and positioned at four compass point locations relative to the primary camera 42. Camera 42 is not shown in FIG. 4b for ease of illustration.

The congruency symbols on the lines of sight depicted in FIGS. 4a and 4b indicate that the cameras 42-46 are at fixed distances and predetermined angles relative to the three-dimensional object 41. In the illustrated preferred embodiment, angles of 45°, 90° and 135° are shown. However, in practice, the number, distance, and angles of the cameras may be determined by the size and three-dimensional complexity of the object. Once determined, the exact camera and object positions are fixed and recorded.

Thus, as discussed above with reference to FIG. 2, the multiple cameras 42-46 photograph the object 41 so as to provide multiple two-dimensional perspective views of the object.

Figure 5A:
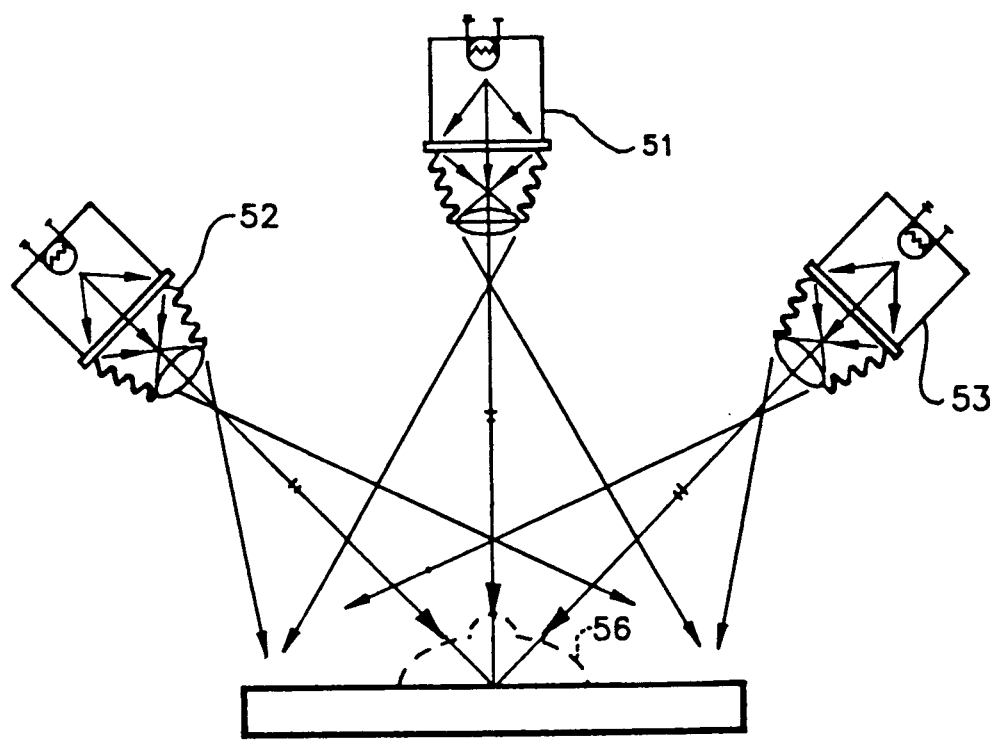
FIGS. 5a and 5b are cross-sectional and plan views showing an arrangement for projecting multiple perspective view of the three-dimensional objects onto a work surface for the purpose of constructing a topographical mold, in accordance with the preferred embodiment.
Figure 5B:
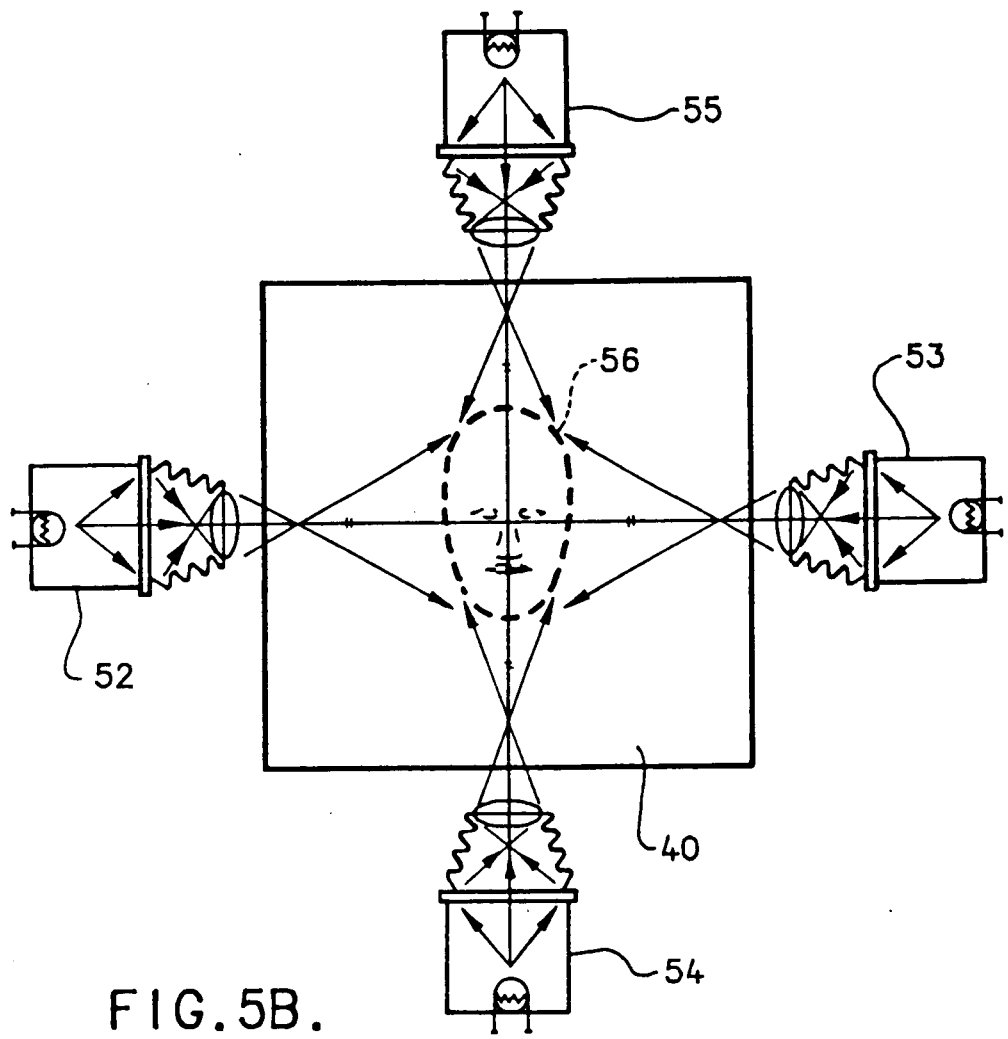

Next, the aforementioned multiple two-dimensional perspective view of th eobject are projected onto the work surface 40 with the object 41 removed, as shown in FIGS. 5a and 5b. In this respect, a primary projector 51 and secondary projectors 52, 53, 54 and 55 are configured using matched optics and the original predetermined angles and distances from which the views derived from cameras 42-46 in FIGS. 4b.

A topographic mold 56 (dashed outline) of the three-dimensional object is then raised or created on the work surface 40 to match the projected views exactly. The mold 56 can be created by hand or more practically from a cast (e.g. plaster cast) taken of the original object 41.

All optics, distances and angles of the projectors 51-55 are matched exactly to the configuration of cameras used to photograph the multiple perspective views in FIGS. 4a and 4b.

Once the topographic mold 56 has been built to match the projected views, and in the event the photographic image includes a perspective background with greater depth than may be achieved by thermoforming limits, the topographic mold 56 can be modified to include bas-relief perspective by flattening the relief in the background and opening up the perspective angles, using the primary point of view projection from projector 51 as a main reference and the secondary (i.e. 45°) projections from projectors 52-55 for regions with missing information caused by line of sight obstructions relative to the primary point of view.

Figure 6A:
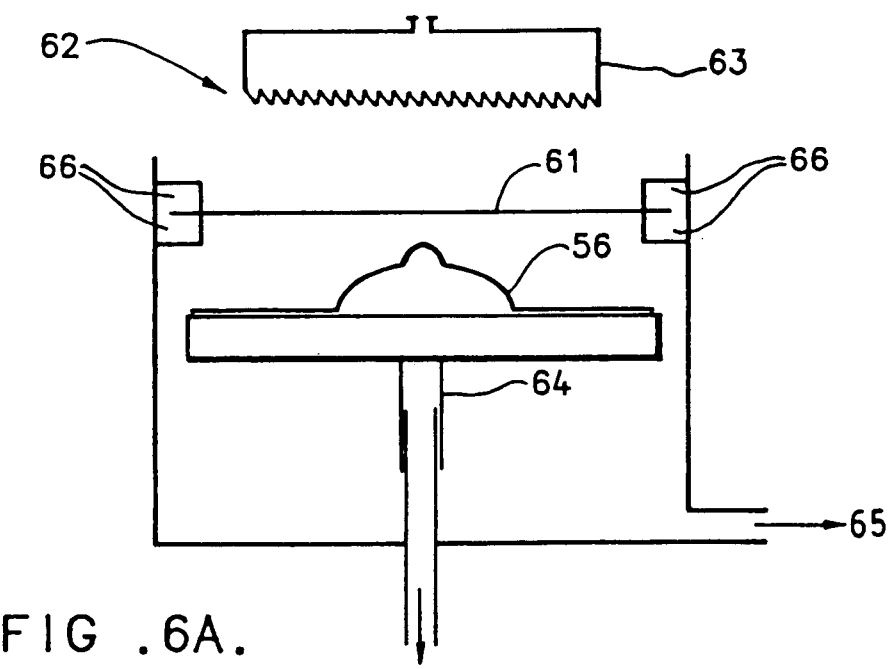
FIGS. 6a and 6b show two steps for thermoforming plastic sheet over the topographical mold.
Figure 6B:
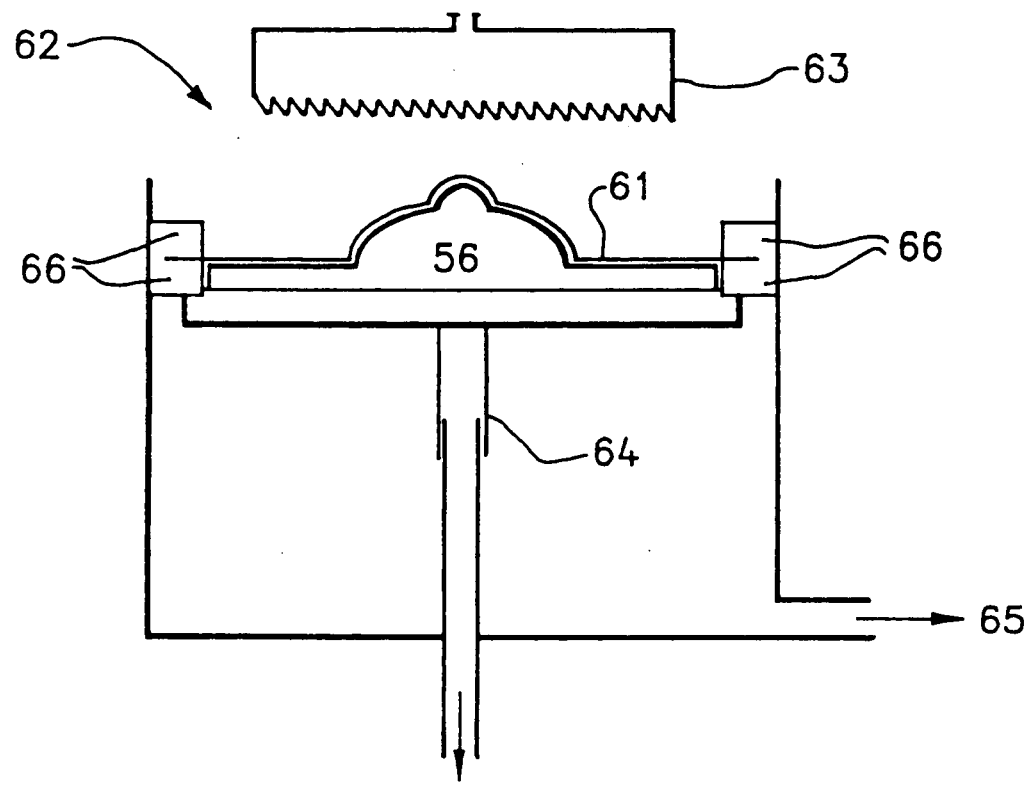

Next, a sheet of thermoformable plastic is thermoformed over the mold as shown with reference to FIGS. 6a and 6b. In particular, a thermoformable plastic sheet 61 is formed over topographic mold 56 by means of a thermoforming apparatus designated generally as 62. The thermoforming system 62 includes a heater 63, a hydraulically operated mold lifting surface 64 for supporting the topographic mold, a vacuum pump 65 and vacuum seals 66, all constructed in accordance with well known prior art.

Although not shown in FIGS. 6a and 6b, the thermoformable plastic sheet 61 is printed with a grid pattern or rectangular array of symbols, (FIG. 7b) which distorts due to stretching and flow of the plastic sheet, as is well known.

Figure 7A:
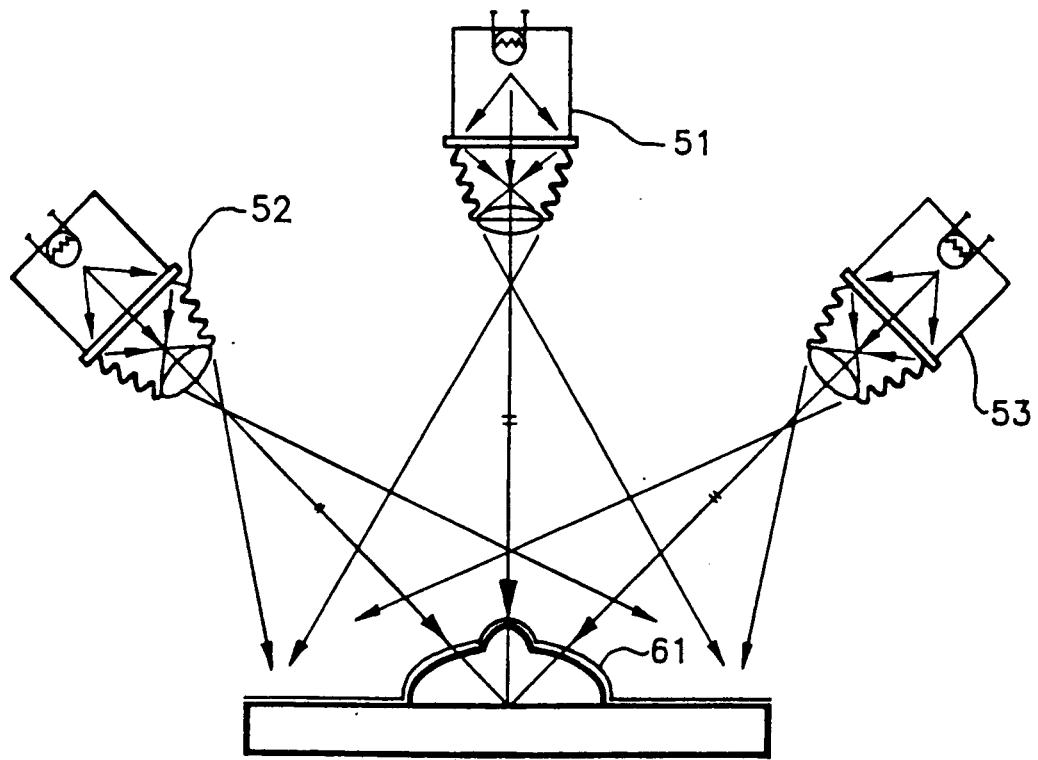
FIGS. 7a and 7b are cross section and plan views respectively of apparatus for projecting perspective views of an original object onto a thermoformed plastic grid in accordance with the preferred embodiment.
Figure 7B:
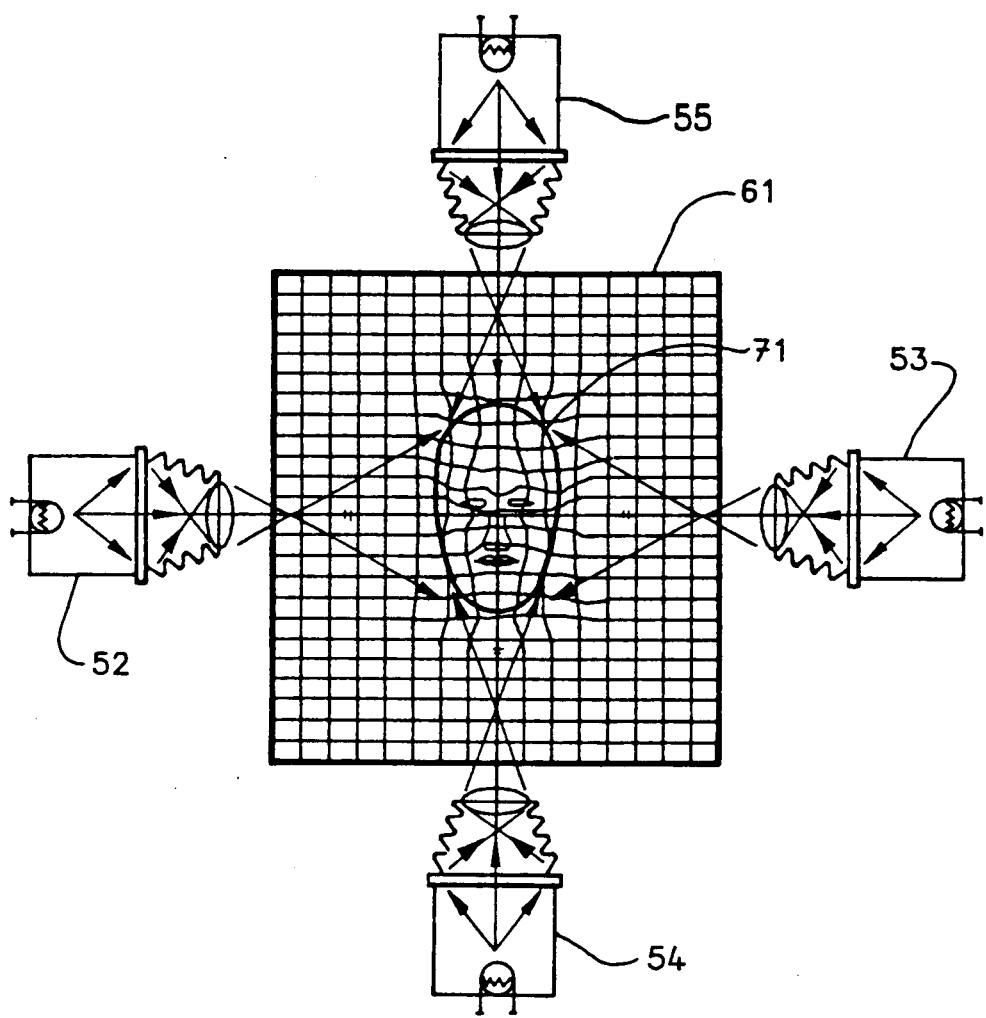
Figure 8:
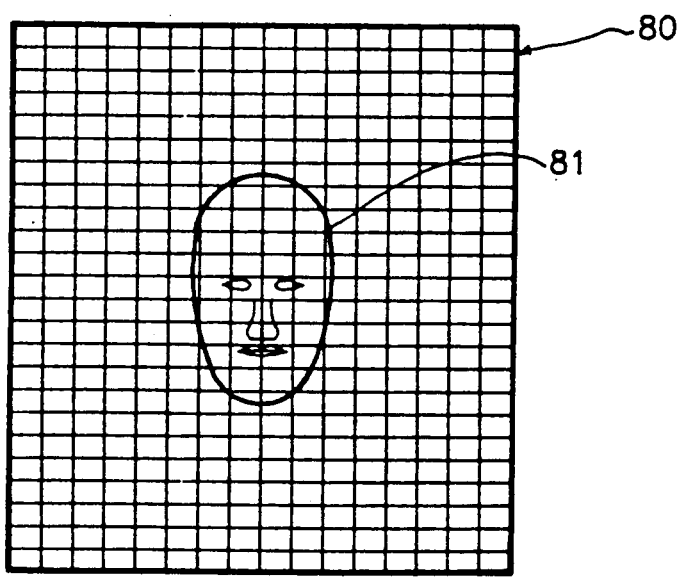
FIG. 8 is a plan view of a distorted two-dimensional image produced by plotting an undistorted three-dimensional projection point by point onto an undistorted grid pattern in accordance with the preferred embodiment.

The perspective views of the original object are then projected onto the thermoformed grid sheet 61 using the same optical arrangement as discussed above with reference to FIGS 5a and 5b, as depicted in FIGS. 7a and 7b. This produces an undistorted, three-dimensional image with a superimposed distorted grid pattern, as designated by reference numeral 71 in FIG. 7b. The distortion of the grid pattern is caused by both stretching of the plastic during thermoforming (as discussed above) and vertical displacement of the grid pattern from the horizontal plane during thermoforming.

Next, the image 71 is transferred (point by point relative to the distorted grid pattern on sheet 61) to a regular (i.e. undistorted) two-dimensional grid surface 80. This results in a predistorted image 81 superimposed on regular grid pattern 80.

This image transference may be accomplished by several means.

According to one approach, numbered coordinates may be assigned to each point detail on the projected three-dimensional surface 71, and then carefully plotted or painted onto the two-dimensional reference grid 80. Using this plot, the predistorted image may be printed onto a thermoformable plastic sheet and then thermoformed over the topographic mold 56 using the apparatus discussed above with reference to FIGS. 6a and 6b. The end result is a three-dimensional image (i.e. display device) which is identical to the original object 41 (FIGS. 4a and 4b).

According to a second approach, a video scanner (not shown) may be connected to the cameras 42-46 (FIGS. 4a and 4b) for scanning and digitizing the multiple views of the object 41 into a computer. Multiple views of the thermoformed grid 61 may then be photographed and digitized using the configuration of cameras as shown in FIGS. 7a and 7b with the same angles, distances and matched optics used to produce the original multiple photographic views. Next, from an identical set-up, photographs of the undistorted grid 80 may be scanned and digitized.

Using one perspective view at a time, and a coordinate approach, the computer can then generate movement vectors for each point on the distorted grid 61, to superimpose it onto the matching point on the undistorted grid 80 scanned from the same perspective. The computer can then produce movement vectors to correct each of the original scanned perspective views of the object on a pixel by pixel basis to their new positions on the scanned regular array 80. Each of these corrected images will be exactly the same except for areas where information is missing because of obstructions in the line of sight of each view. These multiple views are then combined to fill in the blank areas or missing information.

The resulting predistorted two-dimensional computerized image may then be printed onto a thermoformable plastic sheet and then thermoformed over the original topographic mold 56 as shown with the apparatus of FIGS. 6a and 6b.

According to a first alternative embodiment of the present invention, multiple perspective views of the object 41 are photographed using the matched optics from predetermined angles and distances as discussed above with reference to FIGS. 4a and 4b. As with the preferred embodiment discussed above, the number and positions of the cameras 42-46 are determined by the complexity of the three-dimensional object 41. Multiple perspective views are then projected back onto the work surface 40 using matched optics and the original angles and distances as discussed with reference to FIGS. 5a and 5b, and topographic mold 56 of the three-dimensional object is created to match the projected views, as discussed above.

Figure 9:
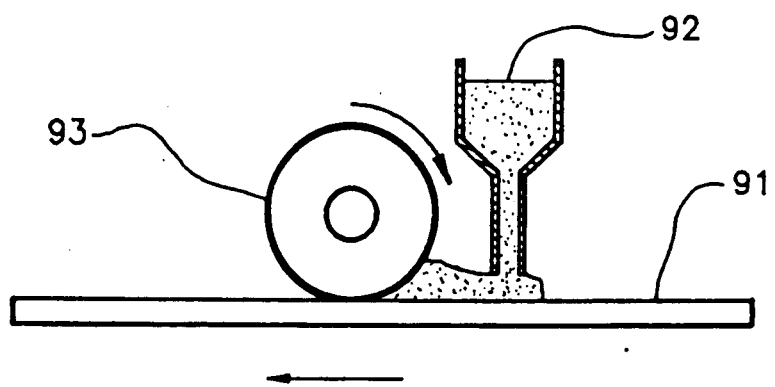
FIG. 9 is a schematic illustration of a device for coating photo emulsion onto a thermoformable plastic sheet in accordance with an alternative embodiment of the present invention.

However, in accordance with the alternative embodiment, a heat resistant photoemulsion is then coated onto an optically clear thermoformable material, such as a translucent sheet of thermoformable plastic 91, as shown in FIG. 9. More particularly, the plastic sheet 91 is coated with a liquid photoemulsion coating 92 which is applied by means of a laminating roller 93.

Figure 10:
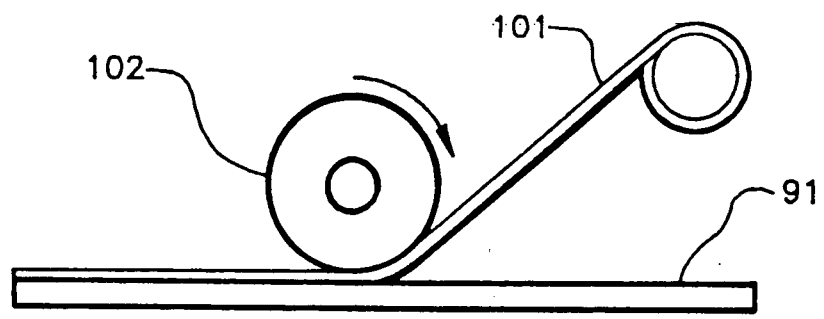
FIG. 10 is a schematic illustration of a device used to laminate a coating onto a thermoformable plastic sheet coated with photo emulsion in accordance with the alternative embodiment.
Figure 11:
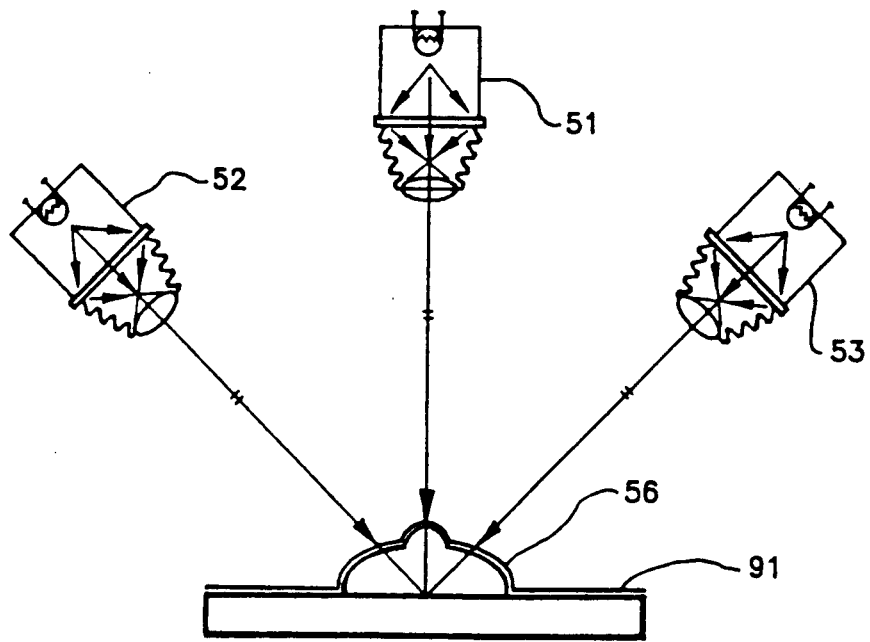
FIG. 11 is a cross sectional schematic of apparatus for projecting perspective views of an original object onto an emulsion coated thermoformed plastic sheet in accordance with the alternative embodiment.

The thermoformable material 91 may then be coated with an opaque stripable coating, such as reflective Molar ™ by means of the apparatus shown with reference to FIG. 10. More particularly, the plastic sheet 91 is coated with Molar ™ sheet 101 by means of a further laminating roller 102.

Next, the sheet 91 is thermoformed over the topographic mold 56 using the equipment of FIGS. 6a and 6b. The opaque layer 101 is subsequently stripped off of the sheet 91 within a dark room and the emulsion coated thermoformed plastic sheet is exposed using the original perspective views of the object with the arrangement of FIGS. 5a and 5b or 7a and 7b.

As an alternative, the stage of applying opaque coating 101 may be omitted and the steps of thermoforming the sheet over the topographic mold and exposing the emulsion may both be conducted in a dark room.

Figure 12A:
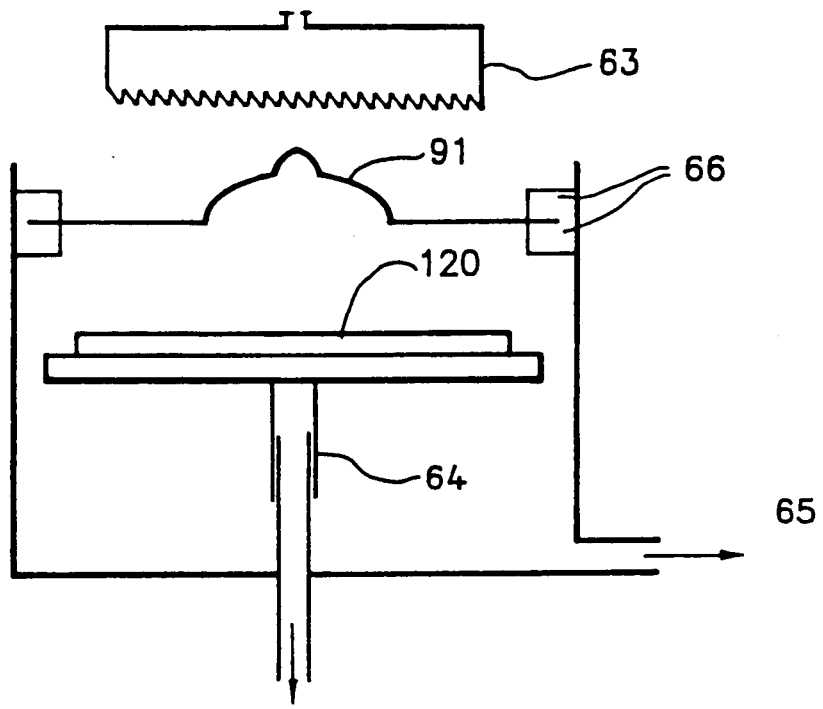
FIGS. 12a and 12b are cross sectional views of apparatus for thermal flattening a plastic sheet over a flat surface.
Figure 12B:
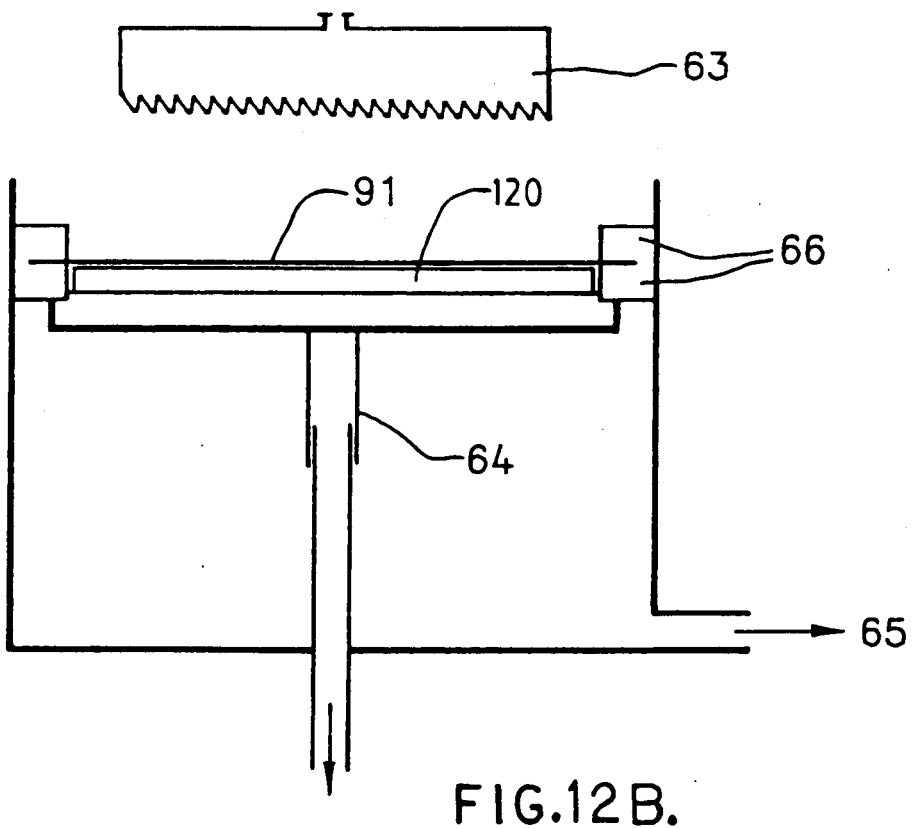

The photographic emulsion 92 may be either positive or negative. In the event a negative photoemulsion is used, the resulting negative is thermoformed flat using the apparatus depicted in FIGS. 12a and 12b. The apparatus of FIGS. 12a and 12b is similar to that of FIGS. 6a and 6b except that an additional flat surface 120 is employed.

The negative 91 is then developed and the resulting image used to produce predistorted images on additional thermoplastic sheets by screenprinting, lithography or traditional photography. The images are then thermoformed over the topographic mold 56 to produce three-dimensional images identical to the original object 41.

In the event that the photoemulsion is positive, after thermoforming and exposing the sheet, the image is then directly developed without thermoflattening to produce the final three-dimensional photographic print.

Modifications and variations of the present invention are possible within the sphere and scope of the claims appended hereto.

We claim:
1. A process for creating a three-dimensional display device, comprising the steps of:
   a) photographing multiple perspective views of a three-dimensional object using a plurality of cameras oriented at respective predetermined positions relative to one another and to said object;
   b) projecting said multiple perspective views of said object onto a plane work surface using a plurality of projectors oriented at said respective predetermined positions, thereby recreating a three-dimensional image of said object;
   c) raising a three-dimensional topographic mold on said work surface for matching exactly said three-dimensional image;
   d) thermoforming a first sheet of thermoformable plastic over said mold said sheet having a first grid pattern on a surface thereof, whereby in the step of thermoforming said grid pattern becomes distorted as a result of stretching and vertical displacement of the grid pattern over said mold;
   e) projecting said multiple perspective views of said object onto said first sheet of thermoformable plastic using said plurality of projectors oriented at said respective predetermined positions, thereby recreating said three-dimensional image superimposed on top of said distorted grid pattern;
   f) translating said three-dimensional image from said distorted grid pattern onto a second two-dimensional undistorted grid pattern, whereby during translation said image becomes predistorted;
   g) transferring said predistorted image from said two-dimensional undistorted grid pattern onto one or more additional sheets of thermoformable plastic; and
   h) thermoforming successive ones of said additional sheets over said mold for creating said three-dimensional display device.

2. The process of claim 1 wherein said steps of translating and transferring further comprise the steps of:
   a) assigning numbered coordinates to each point of said projected three-dimensional image on said distorted grid pattern;
   b) plotting each said numbered coordinate onto a corresponding location on said second grid pattern for creating said predistorted image; and
   c) printing said predistorted image onto said one or more additional sheets of thermoformable plastic.

3. The process of claim 1 comprising the additional steps of:
   a) scanning and digitizing said multiple perspective views of said object into a computer;
   b) scanning and digitizing additional multiple perspective view of said distorted first grid pattern into said computer in accordance with said predetermined positions;
   c) scanning and digitizing further multiple perspective views of said undistorted second grid pattern in accordance with said predetermined positions;
   d) generating a plurality of movement vectors for each point of said projected three-dimensional image on said distorted first digitized grid pattern to a corresponding location on said second digitized grid pattern for each successive one of said multiple views;
   e) applying said movement vectors to said digitized multiple perspective views of said object for translating said image from said distorted first grid pattern onto said undistorted second grid pattern, thereby creating said predistorted image; and
   f) printing said predistorted image onto said one or more additional sheets of thermoformable sheets.

4. A process for creating a three-dimensional display device, comprising the steps of:
   a) photographing multiple perspective views of a three-dimensional object using a plurality of cameras oriented at respective predetermined positions relative to one another and to said object;
   b) projecting said multiple perspective views of said object onto a plane work surface using a plurality of projectors oriented at said respective predetermined positions, therby recreating a three-dimensional image of said object;
   c) raising a three-dimensional topographic mold on said work surface for matching exactly said three-dimensional image;
   d) coating a heat resistant positive photo emulsion onto a translucent sheet of thermoformable plastic;
   e) thermoforming said sheet over said mold;
   f) projecting said multiple perspective views of said object onto said photo emulsion coated sheet of thermoformable plastic using said plurality of projectors oriented at said respective predetermined positions, thereby exposing said photo emulsion with said three-dimensional image; and
   g) developing said photo emulsion for producing said three-dimensional display device.

5. A process for creating a three-dimensional display device, comprising the steps of:
   a) photographing multiple perspective views of a three-dimensional object using a plurality of cameras oriented at respective predetermined positions relative to one another and to said object;
   b) projecting said multiple perspective views of said object onto a plane work surface using a plurality of projectors oriented at said respective predetermined positions, thereby recreating a three-dimensional image of said object;
   c) raising a three-dimensional topographic mold on said work surface for matching exactly said three-dimensional image;
   d) coating a heat resistant negative photo emulsion onto a translucent sheet of thermoformable plastic;
   e) thermoforming said sheet over said mold;
   f) projecting said multiple perspective views of said object onto said photo emulsion coated sheet of thermoformable plastic using said plurality of projectors oriented at said respective predetermined positions, thereby exposing said photo emulsion with said three-dimensional image;
   g) developing said photo emulsion for producing a negative of said image on said sheet;
   h) flattening said sheet and negative of said image for producing a predistorted negative of said image;
   i) printing from said negative said predistorted images on one or more additional sheets of thermoformable plastic; and
   j) thermoforming said one or more additional sheets over said mold for creating said display device.

* * * * *